June 16, 1925.  1,541,955

E. A. HOLLENBECK

MOTOR CULTIVATOR

Filed July 24, 1922  2 Sheets-Sheet 1

Inventor:-
Elijah A. Hollenbeck.

By Walt Mandry

Attorney

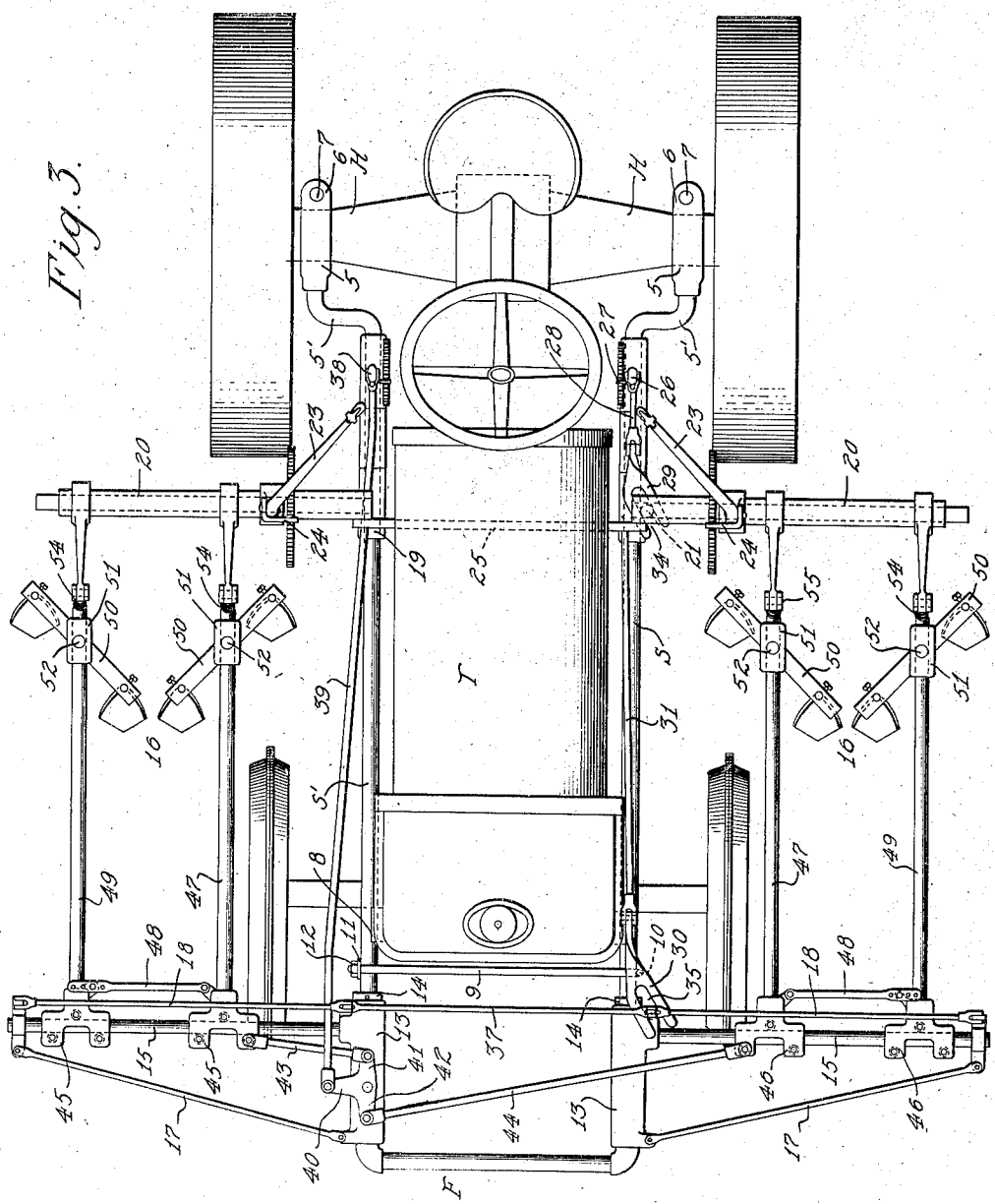

Patented June 16, 1925.

1,541,955

UNITED STATES PATENT OFFICE.

ELIJAH A. HOLLENBECK, OF SHELBY COUNTY, MISSOURI.

MOTOR CULTIVATOR.

Application filed July 24, 1922. Serial No. 577,246.

*To all whom it may concern:*

Be it known that I, ELIJAH A. HOLLENBECK, a citizen of the United States, residing in the county of Shelby and State of Missouri, have invented a new and useful Motor Cultivator, of which the following is a specification.

The main object of the invention is to provide an implement frame to be attached to a tractor, of a well-known type, whereby the adjustments for the cultivator are carried entirely by the frame and are accessible from the seat of the tractor.

The frame is to be rigidly attached to the tractor frame at the front and rear and one lever is designed for each adjustment vertical or horizontal of both of the gangs simultaneously.

In the drawing:

Figure 3 is a plan.

Figure 1:
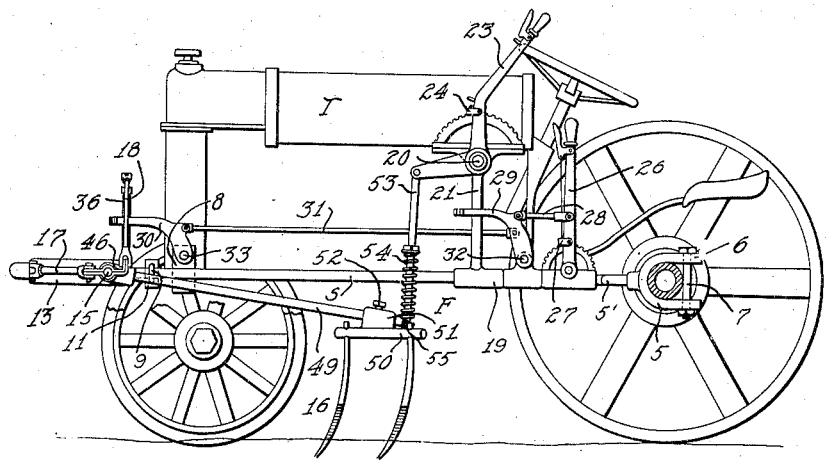
Figure 1 is a side elevation of the tractor with the frame applied, parts of the tractor being cut away.
Figure 2:
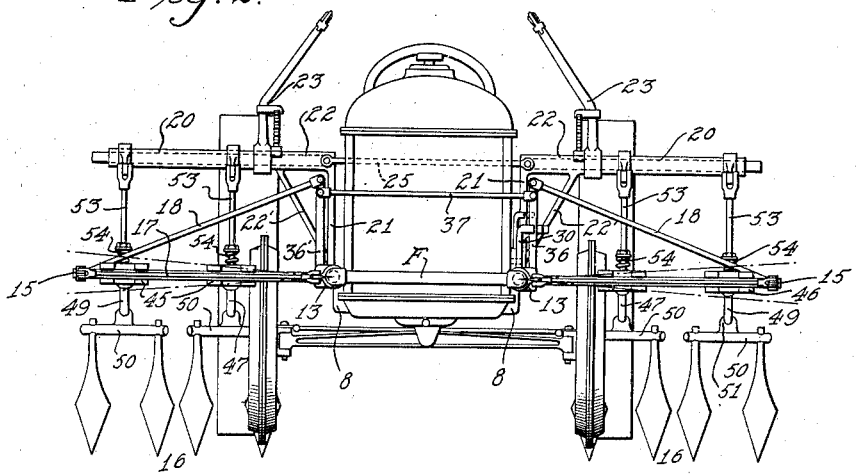
Figure 2 is a front view of the same.
Figure 4:
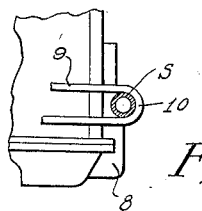
Figure 4 is a detail view.

The tractor is of a well known type and is indicated by the letter T. The implement frame indicated by the letter F is yoke shaped and is rigidly secured to the rear housing of the tractor as shown at 5. Each rear end of the frame is bifurcated as at 6, a bolt 7 passing through the ends of the yoke formed and secured by a nut. The yokes 5 are attached near the outer ends of the housing H. The side bars S and S' of the frame F are bent inwardly as at 5', then extend forwardly in close relation to the tractor to provide ample turning space for the front wheels. The front ends of the side bars of the frame extend some distance in advance of the tractor to provide sufficient space for the cultivator adjustment mechanism.

At the front ends of the frame a casting 8 is fitted over a projection on each side of the radiator frame and acts as a saddle for the implement frame. The frame F is held securely to the casting 8 by means of a U-bolt 9, fitted over one side of the frame as at 10 and connected beyond the other side of the frame by a plate 11, fitted over the free ends of the U-bolt 9 and secured in place by nuts 12.

A bracket 13 is pivotally mounted over each side bar S, S', the brackets extending from near the front ends of the side bars to a point adjacent the U-bolt 9 but spaced therefrom by collars 14. Arms 15 clamped to the brackets 13 extend outwardly to form supports for the front ends of the gang cultivators 16, the arms 15 being braced by draft members 17, secured to brackets 13 and to the outer ends of the said arms 15, and are supported vertically by rods 18 described more in detail later.

A bracket 19 similar to 13 is pivotally mounted over each side bar S, S', in front of the rear wheels, these brackets carrying arms 20 which have vertical portions 21 and outer horizontal portions 22 suitably braced as at 22'. The horizontal portions 22 carry the rear ends of the gang 16. These gangs are raised and lowered by means of levers 23 provided with suitable latch mechanism 24 and connected by link 53 provided with compression spring 54 to the rear ends of beams 47 and 49 as at 55. The two arms 20 are connected by a link 25 referred to later.

An adjusting means comprising lever 26 pivoted to frame S provided with latch means 27 is connected by a link 28 to the cam lever 29, cam 29 being connected to a similar cam 30 at the forward end of the frame by a link 31. The cams 29 and 30 are mounted on transverse pivots 32, 33 to be moved by lever 26. The top horizontal portions of the cams 29 and 30 are provided with diagonal slots 34 and 35 respectively which slots are fitted over the upstanding portion 21 of one arm 20 and an integral arm 36 of bracket 13. This arm 36 is connected by rod 18 to the outer end of arm 15. A similar arm 36' is mounted on the other bracket 13. The two arms 36 and 36' are connected to move together by a link 37.

By this means the lever 26 moves both the front and rear supporting structure of the gangs at the left of the frame vertically through cam slots 34 and 35, this movement being transferred to the opposite gangs through links 25 and 37, so that as the left gangs are raised the right gangs are lowered, and vice versa.

To provide for various width of rows and for irregularities in the rows the lever 38 having a suitable latch is pivoted to the frame S' and connected by link 39 to a lever 40. This lever has arms 41 and 42, connected by links 43, 44 to the pivoted sliding brackets 45, 46, carried on arms 15. The brackets 45, 46 are clamped to the inner cultivator beams 47 and are connected by links 48 to the outer cultivator beams 49. In this way all of the plow beams are moved outwardly or inwardly simultaneously.

The diagonal shanks 50 have collars 51 fitted over the cultivator beams so as to be adjustable around the beams and locked by clamp 52. This is to provide for ridges of varying slopes.

In operation the tractor straddles one row of corn and cultivates the rows on each side.

The levers 23 are set at the proper height for normal cultivating. The lever 26 adjusts the gangs vertically, acting as a leveling device, making unnecessary a lever for each cultivator beam. The lever 38 adjusts the beams to the proper width. All of these levers are within easy reach of the driver of the tractor.

While details are shown to make a complete device, it is obvious that changes may be made so long as they are within the scope of the claims.

What I claim is:

1. A motor plow comprising a tractor, a rigid frame surrounding the tractor body secured to the tractor at front and rear, a plurality of plow beams mounted on said frame, operating means for said beams mounted on the frame adjacent the rear end of the tractor and connected to said beams.

2. An attachment for motor tractors comprising a rigid yoke shaped frame secured to the rear axle housing of the tractor, said frame passing along each side of the tractor and around the front end thereof, brackets independently and pivotally mounted on said frame and carrying plow beams, means for moving said brackets about said pivots to adjust the height of the plow beams, said means mounted adjacent the rear end of the tractor and connected to operate all of the plow beams simultaneously.

3. An attachment for tractors comprising a frame secured to the tractor and having bars extending along side thereof, brackets pivotally mounted on said bars at the front ends thereof, other brackets pivotally mounted on the frame rearwardly of the first mentioned brackets, a plurality of plow beams carried by said brackets, means on said frame for swinging said brackets to elevate said beams, said means connected with all of the brackets to swing the same simultaneously.

4. A cultivator draft attachment for tractors comprising a rigid frame secured to the tractor, arms pivotally mounted on each side of the frame at front and rear and provided with upstanding members, plow beams carried by said arms, cam levers pivotally mounted on said frame and embracing said upstanding members whereby to rock said arms to raise and lower said plow beams on one side of the tractor, connections between said upstanding members whereby to lower or raise the plow beams on the opposite side of the frame.

5. A motor cultivator comprising a frame carrying a plurality of gang cultivators, elevating means for said gangs comprising outwardly extending arms carrying said gangs, upwardly extending members rigid with the outstanding members, levers pivotally mounted on the frame and provided with eccentric cam grooves which embrace said upwardly extending members and operating means for said levers.

6. A cultivator draft attachment for tractors comprising a frame mounted on said tractor, front and rear outwardly extending arms pivoted to the frame on longitudinal pivots, collars pivotally and slidably mounted on said forward arms and carrying cultivator beams, adjusting levers carried by said rear arms and connected to the other ends of said beams to adjust the height of the same, an operating crank mounted on the frame and connected to the collars on each side of the frame to extend or contract the same simultaneously, and an operating lever connected with said crank.

7. A cultivator attachment for tractors comprising a frame secured to the tractor rear axle housing and passing along each side of and around the front end thereof, means for rigidly securing the front end of the frame to the tractor comprising a pair of saddles fitting over the side bars of the frame and a portion of the tractor and secured in place by a U-bolt.

8. A cultivator attachment for tractors comprising a frame secured to the tractor and carrying vertically swinging arms at front and rear, cultivator beams carrying collars pivotally and slidably mounted on one pair of said arms, sleeves rotatably mounted on the other of said pair of arms and carrying adjusting means to vary the height of the plow beams, means mounted on the frame to move the front sliding collars inwardly and outwardly.

9. A cultivator attachment for tractors comprising a frame secured to the tractor, longitudinally extending brackets pivoted on each side of said frame near the forward end thereof, arms secured to the brackets, plow beams adjustably mounted on each arm, draft members extending from the outer ends of the arm to the forward ends of the brackets, means to tilt the arms to vary the height of the plow beams.

10. The combination set forth in claim 9 in which the tilting means comprises struts connected to the outer ends of the arms and the upper portion of the brackets said brackets connected for joint movement.

11. A cultivator attachment for tractors comprising a frame on the tractor, arms on the front end of said frame, plow beams mounted on said arms, other arms mounted on said frame in rear of the first mentioned arms, said second arms comprising upwardly and outwardly extending parts, one adjusting lever for the plow on each side of the frame, connection from said levers to all of the plow beams on the adjacent side of the frame.

In testimony, that I claim the foregoing as my own, I have hereto affixed my signature.

ELIJAH A. HOLLENBECK.